United States Patent Office 3,285,174
Patented Nov. 15, 1966

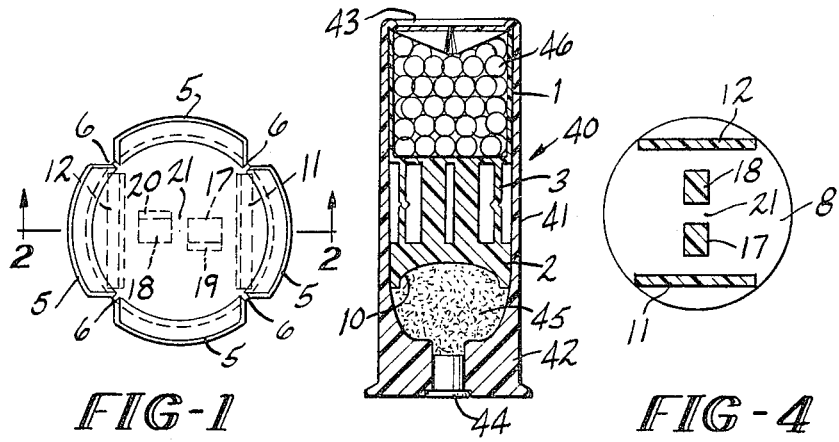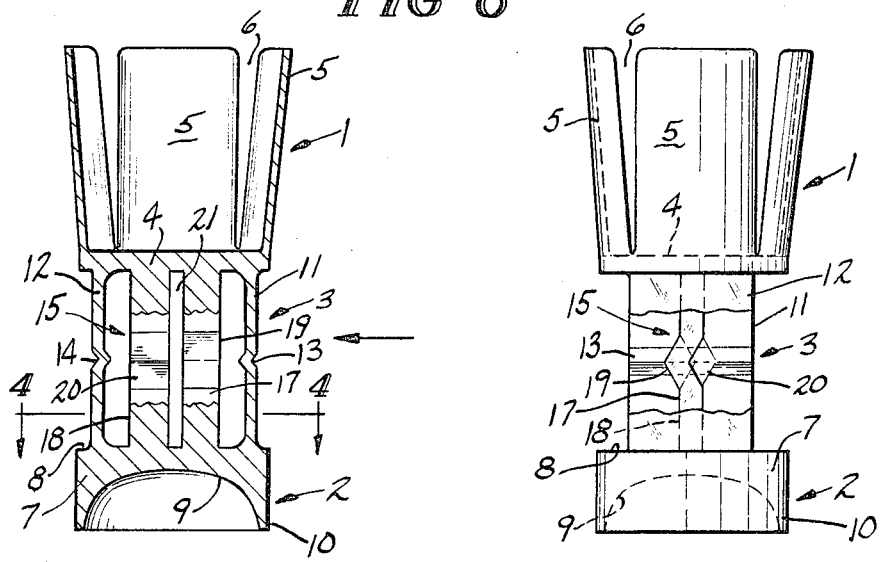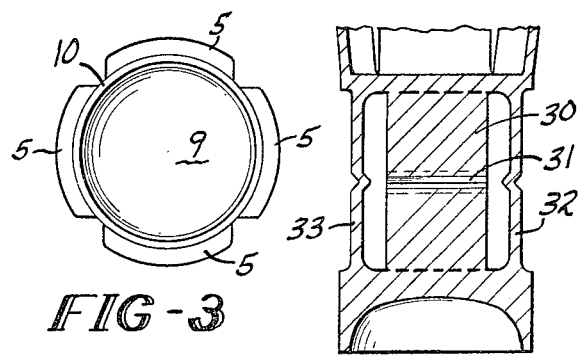

3,285,174
WAD AND SHOT PROTECTOR DEVICE
Vernon C. Moehlman, St. Louis, and Robert J. Klein, Florissant, Mo., assignors to Olin Mathieson Chemical Corporation, a corporation of Virginia
Filed May 28, 1965, Ser. No. 459,598
7 Claims. (Cl. 102—42)

This invention relates to a wad structure for shotshells or the like. More specifically, this invention relates to an integral unitary wad for insertion in a shotshell casing, which functions as an over-powder obturating wad, filler wad and shot protector. The wad of this invention is preferably formed by injection moulding from a plastic material such as polyethylene.

U.S. Patent 3,055,301 shows a shotshell having an over-powder obturating wad, a pair of filler wads, and a plastic sleeve surrounding the shot, all as separate elements. The filler wads are disclosed as being compressible since it is recognized that a certain amount of resiliency and resultant cushioning is desirable in the filler wad portion for proper functioning of the shotshell. Others in the art have attempted to combine the obturating cup wad, filler wads, and shot protector, shown in U.S. Patent 3,055,301, into a single unitary structure. The resultant structures have been unsatisfactory, either because the filler wad portion is too rigid and not sufficiently compressible to provide the desired amount of cushioning or because the filler portion collapses too readily and provides too much cushioning for an effective shot pattern.

The wad of this invention is constructed in a novel manner to allow for a controlled-collapse of the filler wad portion during loading to provide flexibility in setting up a load and during firing to provide the desired amount of rigidity and cushioning in the wad column.

In setting up a load, a certain amount of flexibility in the over-all length of the composite wad is desirable. This flexibility is provided in the novel filler portion of the wad of this invention which can be collapsed upon loading to a predetermined degree to effectively provide composite wads of different over-all lengths.

In loading a shotshell, there are certain elements which are of standard length such as the shell casing, the shot column, and the cup wad. The length of the powder charge, however, varies depending on the type, density, and amount of powder required in different loads.

By providing a composite wad with a filler portion which can be collapsed to a limited extent, without adversely affecting the performance characteristics of the shell, compensation can be made for the different volumes occupied by different powders and powder charges while using the same composite wad. A considerable saving is thereby effected by reducing the number of different length composite wad structures required for different loads.

It is, therefore, a prime object of this invention to provide a composite wad structure for shotshells and the like having a novel filler portion which is collapsible at a controlled rate to allow flexibility in setting up different loads and to effectively cushion the forces applied to the shot column upon firing the shotshell.

It is another object of this invention to provide a novel composite wad structure including a shot protector cup, filler portion and obturating cup moulded from plastic or the like.

It is a further object of this invention to provide a composite wad and shot protector structure which requires no assembling, is light in weight, easy to manufacture, and requires a minimum amount of material.

These and other objects and advantages will be more readily understood in view of the detailed description below with reference to the drawings in which:

FIGURE 1 is an enlarged top-plan view of a preferred embodiment of the composite wad of this invention.
FIGURE 2 is a sectional side view taken along the lines 2—2 of FIGURE 1.
FIGURE 3 is a bottom view of the composite wad of this invention.
FIGURE 4 is a sectional view taken along the lines 4—4 of FIGURE 2.
FIGURE 5 is a side view taken in the direction of the arrow shown in FIGURE 2.
FIGURE 6 is a sectional side view of a shotshell including the composite wad of FIGURE 1.
FIGURE 7 is a side view of a modified wad structure formed in accordance with this invention.

Referring now to the drawings and particularly to FIGURE 2, we show a composite wad structure which consists essentially of a shot-protecting cup 1 and an obturating over-powder cup 2 which are separated and integrally connected together by a filler portion 3. The shot-protector cup includes a transverse base 4 and a plurality of petals 5, which form the sidewall of the cup. The petals 5 are separated by V-shaped slits 6 and are preferably flared outwardly from the base forming an angle of about 5° between the petals. The petals 5 fold or compress inwardly to form a continuous tube-like structure when the composite wad is inserted into a shotshell, as seen in FIGURE 6. The initial flare of the petals insures that the petals firmly engage the sidewall of the casing and prevents shot from filtering between the outside of the petals and the inside of the casing during loading of the shot. As the composite wad leaves the shell upon firing, the petals retain their memory and flare outwardly to their original position and beyond. The air resistance encountered as the wad leaves a gun barrel causes the petals to fold all the way back releasing the shot column with a minimum disturbance to the shot.

The obturating cup 2 includes a transverse base 7 having a generally flat upper surface 8 and a bottom surface 9 which is preferably rounded. A skirt 10 is formed integral with base 7 and extends downwardly therefrom. The skirt 10 is thin and relatively long so that it expands outwardly or obturates very easily to form a gas seal when pressure is applied to the wad upon ignition of the propellant charge positioned in a shell casing below the wad, as seen in FIGURE 6.

The shot-protector cup 1 and obturating cup 2 are spaced and integrally connected together by a filler portion 3. Filler portion 3 includes a pair of outer supports 11 and 12, connected at their ends to the bottom of base 4 and to the upper surface 8 of base 7. Outer supports 11 and 12 are provided with hinges 13 and 14, respectively, positioned intermediate the ends of the supports and arranged so that the outer supports collapse inwardly toward each other as pressure is applied to the composite wad. Filler portion 3 also includes center support 15 positioned between bases 4 and 7 and arranged perpendicular to the outer supports 11 and 12. The center support 15 is preferably comprised of a pair of inner supports 17 and 18, separated by a longitudinal slit 21. Inner supports 17 and 18 are provided with hinges 19 and 20, respectively, located intermediate the ends of the supports. Hinges 19 and 20 extend in opposite directions so that the inner supports collapse outwardly away from each other as pressure is applied to the composite wad. The outward movement of the inner supports and inward movement of the outer supports during the collapse or shortening of the filler portion 3 insures that pressures are uniformly transmitted between the obturating cup 2 and shot cup 1.

The novel construction of the filler portion described above, wherein the inner supports are arranged perpendicular to the outer supports, provides a wad structure having a lateral stability not found in other composite wad structures and arrangements. Side slipping and cocking of the wad inside a shotshell casing are virtually eliminated.

This arrangement also provides a desired amount of resilience and cushioning in the wad by allowing a controlled and balanced collapse of the filler portion, the extent of which is entirely dependent on the amount of pressure exerted against the wad.

In FIGURE 7 we show a modified composite wad which is similar in all respects to the wad of FIGURES 1–6 except for the center support member 30. In the FIGURE 7 embodiment, the center support is a single member having a hinge 31 formed intermediate its ends. Hinge 31 allows support 30 to collapse and shorten as outer supports 32 and 33 collapse inwardly toward each other as described above with reference to the embodiments of FIGURES 1–6. Because of the single inner support and hinge, the wad of FIGURE 7 is somewhat less rigid than the FIGURES 1–5 embodiment. It is, therefore, more useful with lighter loads than the FIGURES 1–5 embodiment.

FIGURE 6 shows the composite wad of FIGURES 1–5 positioned in and forming part of a shotshell 40. Shotshell 40 includes a cylindrical casing 41, a base 42, and an infolded end closure 43. A primer 44 is positioned in base 42 and is operative upon being struck by a firing pin to ignite a propellant charge 45 inside casing 41. The composite wad is positioned in the casing with obturating cup 2 adjacent the propellant charge. Shot 46 is positioned inside shot protector cup 1 which is separated from obturating cup 2 by the filler portion 3.

Upon firing the propellant charge 45, explosive gases act upon obturating cup 2 causing the skirt 10 to flare outwardly against casing 41 forming an effective gas seal. The propellant forces are transmitted from the obturating cup 2 though the filler portion 3 to the shot column positioned in the shot protector cup 1. During the transmission of the propellant forces, the support members comprising the filler portion fold at their hinges allowing the filler portion to collapse in a uniform manner cushioning the forces applied to the shot column. As the wad and shot leave the shell 40 and travel down the barrel of a firearm, the shot is shielded from contact with the barrel by the shot cup 1. This prevents leading of the barrel and distortion of the shot pellets. As the wad leaves the gun barrel, the petals 5, retaining their memory, flare outwardly to the position shown in FIGURE 2, initially releasing the shot. As the wad encounters air resistance, upon leaving the gun barrel, petals 5 fold all the way back completely releasing the shot without disturbing the pattern of the shot.

While the invention has been described in detail with reference to certain preferred embodiments, various changes in design and modifications are contemplated which are within the spirit and scope of the appended claims.

We claim:

1. A wad structure for use in shotshells and the like, said wad including first and second spaced circular transverse wall members, a pair of substantially parallel outer supports connecting said wall members in spaced vertical alignment, a pair of inner supports positioned between said outer supports, first hinge means formed intermediate the ends of each of said outer supports, said outer supports being foldabe inwardly toward each other about said first hinge means, second hinge means formed intermediate the ends of each of said inner supports, said inner supports being foldable outwardly away from each other about said second hinge means, said first hinge means being operable in a direction at right angles to the direction of operation of said second hinge means to allow a shortening of the spacing between said wall members and a cushioned controlled collapse of said wad when compressive pressure is applied to said wall members.

2. The wad structure of claim 1 in which a plurality of petals extends outwardly normal to one of said wall members, said petals being flared outwardly to provide an angle of about 5° between said petals, said petals being compressible inwardly to form a continuous shot cup when inserted into a shotshell casing.

3. The wad of claim 2 further including a thin-walled obturating skirt formed integral with and extending normal to said other wall in a direction opposite to said petals.

4. A composite wad for shotshells and the like including an obturating cup and a shot cup extending in opposite directions, a filler portion vertically spacing and integrally connecting said obturating cup and shot cup, said shot cup including a transverse base and a plurality of petals extending outwardly from the base forming a cup sidewall, said obturating cup including a transverse base and a relatively thin skirt extending outwardly from the base in a direction opposite to said petals, said filler portion including a pair of parallel outer supports connected between said obturating cup base and said shot cup base, each of said outer supports having an inwardly foldable first hinge means formed intermediate its ends allowing said outer supports to fold inwardly toward each other when pressure is applied to said outer supports, a center support extending perpendicular to said outer supports, second hinge means formed intermediate the ends of said center support operable in a direction at right angles to the direction of operation of said first hinge means, said outer supports and said center support being foldable about said hinge means to allow a shortening and controlled collapse of said filler portion as pressure is applied thereto.

5. The wad of claim 4 in which said petals are normally flared outwardly forming a V-shaped slit between the petals.

6. A composite wad for shotshells and the like including an upper and a lower transverse wall vertically spaced from each other, support means spacing and integrally connecting said wall members and defining a filler portion, said support means including a pair of parallel outer supports connected at their ends to said wall members, a pair of aligned inner supports, said inner supports lying in a plane substantially perpendicular to the planes of said outer supports and connected at their ends to said wall members, hinge means formed intermediate the ends of each of said supports, said outer supports being foldable inwardly toward each other about their respective hinge means and said inner supports being foldable outwardly away from each other about their respective hinge means operative to allow a uniform controlled collapse of said filler portion as pressure is applied thereto, an obturating skirt extending downwardly from said lower wall to provide an obturating cup and a plurality of petals extending upwardly from said upper wall to provide a shot cup.

7. The wad of claim 6 in which said petals are normally flared outwardly to initiate the opening of said shot cup and release of the shot as the wad leaves a gun barrel upon firing from a shotshell.

References Cited by the Examiner

UNITED STATES PATENTS 3,217,648   11/1965   Foote et al. _____ 102—42

OTHER REFERENCES

Remington catalog, Aug. 27, 1964, p. 43.

SAMUEL FEINBERG, *Primary Examiner.*

ROBERT F. STAHL, *Examiner.*